United States Patent
Jung et al.

(10) Patent No.: US 7,680,175 B2
(45) Date of Patent: Mar. 16, 2010

(54) APPARATUS AND METHOD FOR TRANSMITTING/RECEIVING SIGNAL IN A COMMUNICATION SYSTEM USING A PLURALITY OF TRANSMIT ANTENNAS

(75) Inventors: Young-Ho Jung, Seoul (KR); Yung-Soo Kim, Seongnam-si (KR); Seung-Hoon Nam, Seoul (KR)

(73) Assignee: Samsung Electronics Co., Ltd (KR)

( * ) Notice: Subject to any disclaimer, the term of this patent is extended or adjusted under 35 U.S.C. 154(b) by 703 days.

(21) Appl. No.: 11/542,858

(22) Filed: Oct. 4, 2006

(65) Prior Publication Data
US 2007/0153759 A1 Jul. 5, 2007

(30) Foreign Application Priority Data
Oct. 5, 2005 (KR) .................. 10-2005-0093621

(51) Int. Cl.
H04L 27/30 (2006.01)
(52) U.S. Cl. .................. 375/146; 375/267; 375/299; 342/74; 342/82; 342/354; 342/359; 342/374; 455/107; 455/123; 455/562.1
(58) Field of Classification Search .................. 375/146, 375/219, 260, 267, 285, 295, 296, 299; 342/74, 342/81, 82, 354, 359, 360, 368, 374; 455/63.1, 455/91, 101, 107, 121, 123, 562.1, 575.7
See application file for complete search history.

(56) References Cited

U.S. PATENT DOCUMENTS

| 6,317,411 | B1 * | 11/2001 | Whinnett et al. ............ 370/204 |
| 6,804,307 | B1 | 10/2004 | Popovic |
| 7,333,551 | B2 * | 2/2008 | Hwang et al. ............... 375/265 |
| 7,366,249 | B2 * | 4/2008 | Gresset et al. .............. 375/267 |
| 7,430,244 | B2 * | 9/2008 | Chung et al. ................ 375/267 |
| 7,463,693 | B2 * | 12/2008 | Chae et al. ................... 375/267 |
| 7,480,339 | B2 * | 1/2009 | Hwang et al. ............... 375/267 |
| 7,505,527 | B2 * | 3/2009 | Hwang et al. ............... 375/267 |
| 2005/0078764 | A1 | 4/2005 | Gresset et al. |
| 2005/0135499 | A1 * | 6/2005 | Nam et al. |
| 2006/0056539 | A1 * | 3/2006 | Nam et al. |
| 2006/0093061 | A1 * | 5/2006 | Chae et al. |
| 2006/0093062 | A1 * | 5/2006 | Yun et al. |
| 2006/0093066 | A1 * | 5/2006 | Jeong et al. |
| 2006/0107167 | A1 * | 5/2006 | Jeong et al. |
| 2006/0153312 | A1 * | 7/2006 | Yun et al. |
| 2007/0291638 | A1 * | 12/2007 | Chae et al. |
| 2008/0013642 | A1 * | 1/2008 | Nam et al. |
| 2008/0101327 | A1 * | 5/2008 | Kim et al. |
| 2008/0260053 | A1 * | 10/2008 | Yun et al. |
| 2009/0135939 | A1 * | 5/2009 | Hwang et al. |

FOREIGN PATENT DOCUMENTS

| CN | 1348642 | 5/2002 |
| CN | 1630226 | 6/2005 |
| KR | 1020050065058 | 6/2005 |

* cited by examiner

Primary Examiner—Dac V Ha
(74) Attorney, Agent, or Firm—The Farrell Law Firm, LLP

(57) ABSTRACT

An apparatus and method for transmitting/receiving a signal in a communication system with a plurality of antennas are provided. Received modulation symbols of channel coded transmission information data are generated using a space-time mapping scheme and processed to RF symbols. The RF symbols are transmitted through antennas among the plurality of antennas.

30 Claims, 4 Drawing Sheets

APPARATUS AND METHOD FOR TRANSMITTING/RECEIVING SIGNAL IN A COMMUNICATION SYSTEM USING A PLURALITY OF TRANSMIT ANTENNAS

PRIORITY

This application claims priority under 35 U.S.C. §119 to an application filed in the Korean Intellectual Property Office on Oct. 5, 2005 and assigned Serial No. 2005-93621, the contents of which are herein incorporated by reference.

BACKGROUND OF THE INVENTION

1. Field of the Invention

The present invention relates generally to an apparatus and method for transmitting/receiving a signal in an Orthogonal Frequency Division Multiplexing/Orthogonal Frequency Division Multiple Access (OFDM/OFDMA) communication system, and in particular, to an apparatus and method for transmitting/receiving a signal in an OFDM/OFDMA communication system using a plurality of antennas.

2. Description of the Related Art

The basic issue in communications is how efficiently and reliably to transmit data on channels. Along with the demand for a high-speed communication system capable of processing and transmitting video and wireless data in addition to the traditional voice service, increasing system efficiency using an appropriate channel-coding scheme is critical to future-generation multimedia mobile communication systems, which is now under active study.

Generally, in the wireless channel environment of a mobile communication system, unlike a wired channel environment, a transmission signal inevitably experiences loss due to several factors such as multipath interference, shadowing, wave attenuation, time-variant noise, interference, and fading.

The resulting information loss causes a severe distortion to the actual transmission signal, degrading the whole system performance. In order to reduce the information loss, many error control techniques are usually adopted depending on the characteristics of channels to thereby increase system reliability. The basic one of them is to use an error correction code.

Communication instability caused by multipath fading is relieved by diversity schemes. The diversity schemes are classified into time diversity scheme, frequency diversity scheme, and antenna diversity (i.e. spatial diversity) scheme.

The antenna diversity scheme uses multiple antennas. This diversity scheme is further branched into receive (Rx) antenna diversity scheme using a plurality of Rx antennas, transmit (Tx) antenna diversity scheme using a plurality of Tx antennas, Multiple-Input Multiple-Output (MIMO) scheme using a plurality of Tx antennas and a plurality of Rx antennas, and Multiple-Input Single-Output (MISO) scheme. MIMO scheme and MISO scheme are special cases of Space-Time Coding (STC) scheme that extends coding from the time domain to the space domain by transmission of a signal encoded in a predetermined coding scheme through a plurality of Tx antennas, with the aim to achieve lower error rate.

A description will be made of the configuration of a transmitter with four Tx antennas in an OFDM/OFDMA communication system using an STC scheme.

FIG. 1 is a block diagram of a transmitter with four Tx antennas in a typical OFDM/OFDMA communication system using an STC scheme.

Referring to FIG. 1, the transmitter includes an encoder 111, a modulator 113, a space-time mapper 115, first to fourth Radio Frequency (RF) processors 117-1 to 117-4, and first to fourth Tx antennas 119-1 to 119-4.

For the input of information data bits, the encoder 111 encodes them in a predetermined encoding method such as convolutional coding, turbo coding, etc. The modulator 113 modulates the coded bits in a predetermined modulation scheme. The modulation scheme can be one of Binary Phase Shift Keying (BPSK), Quadrature Phase Shift Keying (QPSK), Quadrature Amplitude Modulation (QAM), Pulse Amplitude Modulation (PAM), and Phase Shift Keying (PSK).

The space-time mapper 115 maps the modulation symbols received from the modulator 113 in a predetermined space-time mapping method. Let the modulation symbols be denoted by $x_1$ $x_2$ $x_3$ $x_4$. Then it is assumed that the four modulation symbols $x_1$ $x_2$ $x_3$ $x_4$ form one codeword and four symbol time intervals are taken to transmit one codeword. A time interval for which one codeword is transmitted is called a "codeword transmission time interval". The space-time mapping is carried out as follows.

$$G_4 = \begin{bmatrix} e^{j\theta_1} x_1 & x_2 & x_3^* & e^{-j\theta_1} x_4^* \\ x_2^* & -e^{-j\theta_1} x_1^* & e^{j\theta_1} x_4 & -x_3 \\ x_3 & e^{j\theta_1} x_4 & -e^{-j\theta_1} x_1^* & -x_2^* \\ e^{-j\theta_1} x_4^* & -x_3^* & -x_2 & e^{j\theta_1} x_1 \end{bmatrix} \quad (1)$$

where $G_4$ represents a coding matrix for symbols transmitted through the four Tx antennas. The columns and rows of the coding matrix represent the Tx antennas and symbol time intervals, respectively.

Thus, for a first symbol time interval $t_1$, $e^{j\theta_1}x_1$ is transmitted through the first Tx antenna 119-1, $x_2$ through the second Tx antenna 119-2, $x^*_3$ through the third Tx antenna 119-3, and $e^{-j\theta_1}x^*_4$ through the fourth Tx antenna 119-4. For a second symbol time interval $t_2$, $x^*_2$ is transmitted through the first Tx antenna 119-1, $-e^{-j\theta_1}x^*_1$ through the second Tx antenna 119-2, $e^{j\theta_1}x_4$ through the third Tx antenna 119-3, and $-x_3$ through the fourth Tx antenna 119-4. For a third symbol time interval $t_3$, $x_3$ is transmitted through the first Tx antenna 119-1, $e^{j\theta_1}x_4$ through the second Tx antenna 119-2, $-e^{-j\theta_1}x^*_1$ through the third Tx antenna 119-3, and $-x^*_2$ through the fourth Tx antenna 119-4. For a fourth symbol time interval $t_4$, $e^{-j\theta_1}x^*_4$ is transmitted through the first Tx antenna 119-1, $-x^*_3$ through the second Tx antenna 119-2, $-x_2$ through the third Tx antenna 119-3, and $e^{j\theta_1}x_1$ through the fourth Tx antenna 119-4.

The space-time mapper 115 maps the modulation symbols using the coding matrix $G_4$, so that they can be transmitted through the corresponding Tx antennas for the corresponding symbol time intervals.

Specifically, for the first symbol time interval $t_1$, the space-time mapper 115 outputs $e^{j\theta_1}x_1$ to the first RF processor 117-1, $x_2$ to the second RF processor 117-2, $x^*_3$ to the third RF processor 117-3, and $e^{j\theta_1}x^*_4$ to the fourth RF processor 117-4. For the second symbol time interval $t_2$, the space-time mapper 115 outputs $x^*_2$ to the first RF processor 117-1, $-e^{-j\theta_1}x^*_1$ to the second RF processor 117-2, $e^{j\theta_1}x_4$ to the third RF processor 117-3, and $-x_3$ to the fourth RF processor 117-4. For the third symbol time interval $t_3$, the space-time mapper 115 outputs $x_3$ to the first RF processor 117-1, $e^{j\theta_1}x_4$ to the second RF processor 117-2, $-e^{-j\theta_1}x^*_1$ to the third RF processor 117-3, and $-x^*_2$ to the fourth RF processor 117-4. For the fourth symbol time interval $t_4$, the space-time mapper 115 outputs $e^{-j\Theta_1}x^*_4$ to the first RF processor 117-1, $-x^*_3$ to the second RF processor 117-2, $-x_2$ to the third RF processor 117-3, and $e^{j\Theta_1}x_1$ to the fourth RF processor 117-4.

The first to fourth RF processors 117-1 to 117-4 process the received signals to RF signals and transmit them through the corresponding Tx antennas. That is, the first RF processor 117-1 is mapped to the first Tx antenna 119-1, the second RF processor 117-2 to the second Tx antenna 119-2, the third RF processor 117-3 to the third Tx antenna 119-3, and the fourth RF processor 117-4 to the fourth Tx antenna 119-4.

Besides the information data, a reference signal for channel estimation is transmitted through the first to fourth Tx antennas 119-1 to 119-4 for the codeword transmission time interval, while not shown in FIG. 1. The reference signal is a pilot signal, for example. A pilot signal transmitted through each of the Tx antennas 119-1 to 119-4 occupies a different frequency domain, i.e. different subcarriers, and each of the Tx antennas 119-1 to 119-4 has to discontinue pilot transmission in subcarrier areas for the other Tx antennas. The subcarriers carrying the pilot signal are called "pilot subcarriers".

When a plurality of Tx antennas are used as illustrated in FIG. 1, a Tx antenna diversity gain corresponding to the number of the Tx antennas is achieved. However, the use of frequency diversity scheme limits the Tx antenna diversity gain.

In the OFDM/OFDMA communication system using a plurality of Tx antennas, limited resources, i.e. pilot subcarriers are divided for the Tx antennas, thereby degrading channel estimation performance. In addition, as many RF processors as the number of the Tx antennas are required, thus increasing hardware complexity and cost.

Accordingly, there exists a need for a signal transmitting/receiving method for minimizing hardware complexity and cost, while improving channel estimation performance in an OFDM/OFDMA communication system with a plurality of Tx antennas.

SUMMARY OF THE INVENTION

An object of the present invention is to substantially solve at least the above problems and/or disadvantages and to provide at least the advantages below. Accordingly, the present invention provides an apparatus and method for transmitting/receiving a signal in an OFDM/OFDMA communication system using a plurality of Tx antennas.

The present invention provides a signal transmitting/receiving apparatus and method for improving channel estimation performance in an OFDM/OFDMA communication system using a plurality of Tx antennas.

The present invention further provides a signal transmitting/receiving apparatus and method for minimizing hardware complexity and cost in an OFDM/OFDMA communication system using a plurality of Tx antennas.

According to one aspect of the present invention, in a signal transmitter with a plurality of antennas in a communication system, a space-time mapper generates symbols by mapping modulation symbols of channel coded transmission information data using a space-time mapping scheme and provides the generated symbols to RF processors. A plurality of RF processors process the generated symbols to RF symbols. A plurality of switches coupled to the plurality of RF processors, a plurality of switches coupled to the plurality of RF processors, for switching the plurality of RF processors to the plurality of antennas so that signals output from the RF processors are transmitted through the antennas.

According to another aspect of the present invention, in a signal transmitter with a plurality of antennas in a communication system, a space-time mapper generates symbols by mapping modulation symbols of channel coded transmission information data using a space-time mapping scheme and provides the generated symbols to RF processors. A plurality of RF processors process the generated symbols to RF symbols and provide the RF symbols to antennas.

According to a further aspect of the present invention, in a method of transmitting a signal in a signal transmitter with a plurality of antennas in a communication system, generating symbols by mapping modulation symbols of channel coded transmission information data are mapped using a space-time mapping scheme and processed into RF symbols. The RF symbols are transmitted through antennas among the plurality of antennas.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention provides a signal transmitting/receiving apparatus and method in an Orthogonal Frequency Division Multiplexing/Orthogonal Frequency Division Multiple Access (OFDM/OFDMA) mobile communication system using a multiple Tx antenna scheme. Particularly, the present invention provides a signal transmitting/receiving apparatus and method for improving channel estimation performance and minimizing hardware complexity and cost by use of a rate 1 Space-Time Coding (STC) scheme according to one aspect of the present invention and a rate 2 STC scheme in an OFDM/OFDMA mobile communication system using a plurality of Tx antennas according to another aspect of the present invention. Herein, the rate 1 STC scheme is a scheme according to the first embodiment of the present invention, and the rate 2 STC scheme is a scheme according to the second embodiment of the present invention.

The present invention pertains to a signal transmitting/receiving apparatus and method in the case where a transmitter uses a plurality of Tx antennas, for example four Tx antennas and the rate 1 STC scheme, and a receiver uses one or more Rx antennas. The present invention also pertains to a signal transmitting/receiving apparatus and method in the case where a transmitter uses a plurality of Tx antennas, for example four Tx antennas and the rate 2 STC scheme, and a receiver uses two or more Rx antennas.

Figure 2:
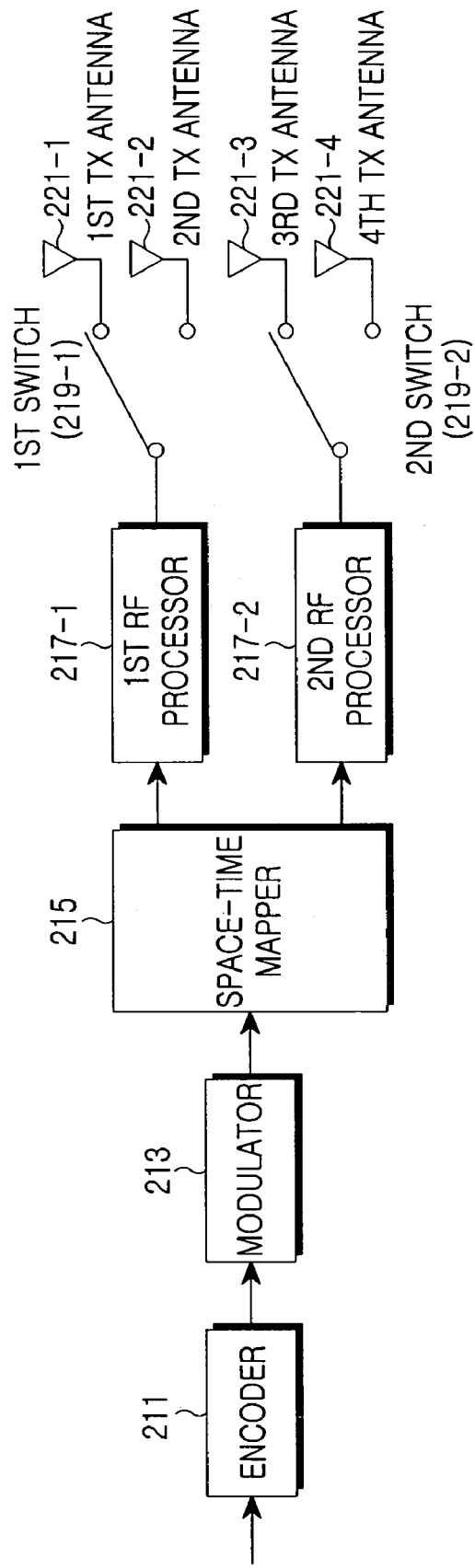
FIG. 2 is a block diagram of a transmitter in an OFDM/OFDMA communication system with a plurality of Tx antennas using an STC scheme according to the present invention.

Referring to FIG. 2, the transmitter includes an encoder 211, a modulator 213, a space-time mapper 215, first and second RF processors 217-1 and 217-2, first and second switches 219-1 and 219-2, and first to fourth Tx antennas 221-1 to 221-4.

For the input of information data bits, the encoder 211 encodes them in a predetermined encoding method such as convolutional coding, turbo coding, etc. The modulator 213 modulates the coded bits in a predetermined modulation scheme. The modulation scheme can be one of BPSK, QPSK, QAM, PAM, and PSK.

Space-time mapper 215, in a predetermined space-time mapping method, maps the modulation symbols received from modulator 213 and provides signals to be transmitted through the first and second Tx antennas 221-1 and 221-2 to the first RF processor 217-1, and signals to be transmitted through the third and fourth Tx antennas 221-3 and 221-4 to the second RF processor 217-2.

The first and second RF processors 217-1 and 217-2 process the received signals to RF signals and provide the RF signals to the first and second switches 219-1 and 219-2. First switch 219-1 switches the first RF processor 217-1 to the first or second Tx antenna 221-1 or 221-2 under the control of the space-time mapper 215 so that space-processor 217-2 to the third or fourth Tx antenna 221-3 or 221-4 under the control of the space-time mapper 215 so that space-time mapped symbols can be transmitted through a corresponding Tx antenna for a corresponding symbol time interval.

Space-time mapper 215 outputs the modulation symbols to the first and second RF processors 217-1 and 217-2 in the manner illustrated in Table 1 below.

TABLE 1

|  | $t_1$ | $t_2$ | $t_3$ | $t_4$ |
|---|---|---|---|---|
| First Tx antenna 221-1 | ○ | ○ | | |
| Second Tx antenna 221-2 | | | ○ | ○ |
| Third Tx antenna 221-3 | ○ | ○ | | |
| Fourth Tx antenna 221-4 | | | ○ | ○ |

Let the modulation symbols from the modulator 213 be denoted by $x_1\ x_2\ x_3\ x_4$. It is assumed herein that the four-modulation symbols $x_1\ x_2\ x_3\ x_4$ form one codeword and four symbol time intervals are taken to transmit one codeword. A time interval for which one codeword is transmitted is called a "codeword transmission time interval".

Referring to Table 1, in accordance with the present invention, space-time mapped symbols are transmitted through the first and third Tx antennas 221-1 and 221-3, with no symbols transmitted through the second and fourth Tx antennas 221-2 and 221-4, for a first symbol time interval to. As with $t_1$, for a second symbol time interval $t_2$, space-time mapped symbols are transmitted through the first and third Tx antennas 221-1 and 221-3, with no symbols transmitted through the second and fourth Tx antennas 221-2 and 221-4. For a third symbol time interval $t_3$, space-time mapped symbols are transmitted through the second and fourth Tx antennas 221-2 and 221-4, with no symbols transmitted through the first and third Tx antennas 221-1 and 221-3. As with $t_3$, for a fourth symbol time interval $t_4$, space-time mapped symbols are transmitted through the second and fourth Tx antennas 221-2 and 221-4, with no symbols transmitted through the first and third Tx antennas 221-1 and 221-3.

Space-time mapper 115 outputs signals to the first RF processor 217-1 to be transmitted through the first and second Tx antennas 221-1 and 221-2, and signals to the second RF processor 217-2 to be transmitted through the third and fourth Tx antennas 221-3 and 221-4. The first and second RF processors 217-1 and 217-2 process the received signals to RF signals and provide the RF signals to the first and second switches 219-1 and 219-2.

First switch 219-1 switches the signal from the first RF processor 217-1 to the first Tx antenna 221-1 for the first and second symbol time intervals $t_1$ and $t_2$, and to the second Tx antenna 221-2 for the third and fourth symbol time intervals $t_3$ and $t_4$.

Second switch 219-2 switches the signal from the second RF processor 217-2 to the third Tx antenna 221-3 for the first and second symbol time intervals $t_1$ and $t_2$, and to the fourth Tx antenna 221-4 for the third and fourth symbol time intervals $t_3$ and $t_4$.

In addition to the information data, a reference signal for channel estimation (not shown in FIG. 2) is transmitted through the first to fourth Tx antennas 221-1 to 221-4 for the codeword transmission time interval. The reference signal is a pilot signal, for example. Each of the Tx antennas 221-1 to 221-4 has to discontinue pilot transmission in subcarrier areas for the other Tx antennas. The subcarriers carrying the pilot signal are called "pilot subcarriers".

Pilot signals are transmitted only through Tx antennas that transmit symbols for the codeword transmission time interval in accordance with the present invention, which will be described with reference to FIG. 3.

Figure 3:
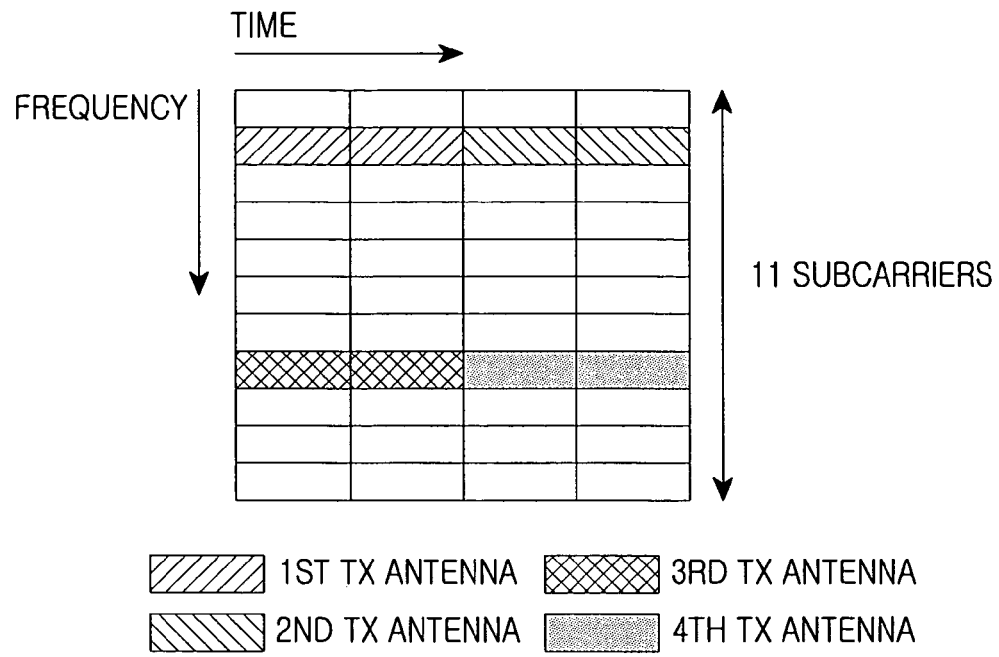
FIG. 3 illustrates a pilot signal transmission operation in the OFDM/OFDMA communication system with a plurality of Tx antennas using a STC scheme according to the present invention.

Referring to FIG. 3, for the first and second symbol time intervals $t_1$ and $t_2$, pilot signals are transmitted through only the first and third Tx antennas 221-1 and 221-3 because the first and third Tx antennas 221-1 and 221-3 transmit symbols. For the third and fourth symbol time intervals $t_3$ and $t_4$, pilot signals are transmitted through only the second and fourth Tx antennas 221-2 and 221-4 because the second and fourth Tx antennas 221-2 and 221-4 transmit symbols.

Since pilot signals are transmitted through Tx antennas transmitting symbols rather than through all the Tx antennas, limited resources, i.e. pilot subcarriers are shared between only two Tx antennas, not among all the Tx antennas, channel estimation performance is improved.

As described in FIGS. 2 and 3, symbols and pilot signals are transmitted through only two Tx antennas in corresponding symbol time intervals, thereby improving channel estimation performance. With the use of the two Tx antennas, no more than two RF processors are required. As a consequence, hardware complexity and cost are decreased.

While not separately shown in FIGS. 2 and 3, a receiver receives signals from the transmitter through one or more Rx antennas. As shown in Table 1, the receiver receives signals from the four Tx antennas for four symbol time intervals in a rate 1 STC scheme, thereby achieving full diversity gain. Also, the receiver performs channel estimation on a symbol-by-symbol basis. Since the transmitter transmits pilot signals through two Tx antennas in each symbol time interval, the channel estimation performance of the receiver is improved.

Figure 1:
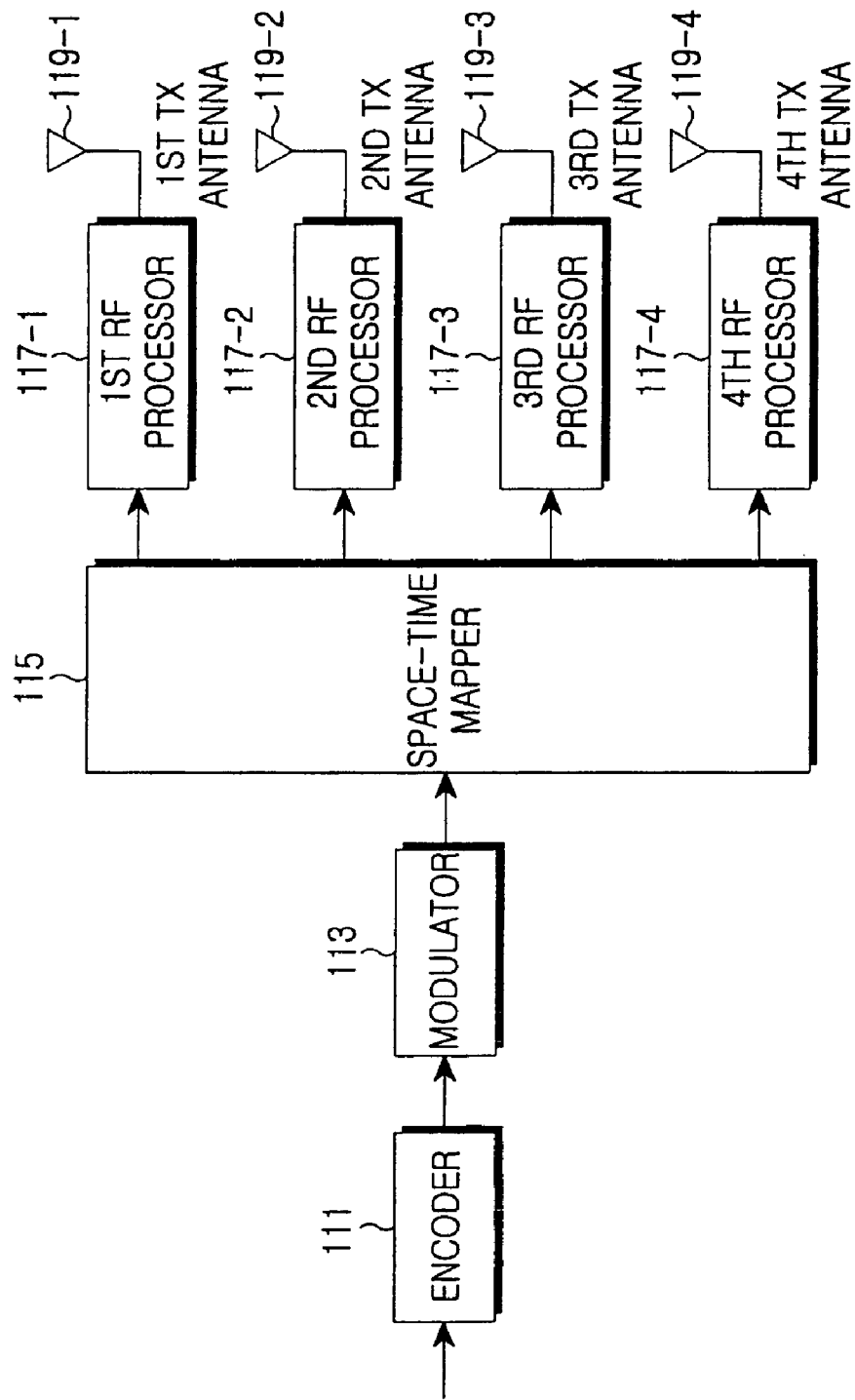
FIG. 1 is a block diagram of a transmitter with four Tx antennas in a typical OFDM/OFDMA communication system using an STC scheme.

According to another embodiment of the present invention, in an OFDM/OFDMA communication system with a plurality of Tx antennas using a STC scheme, a transmitter uses a plurality of Tx antennas described with reference to FIG. 1 and is basically similar in structure to the transmitter of the typical OFDM/OFDMA communication system, except that the space-time mapper 115 and first to fourth RF processors 117-1 to 117-4 under the control of the space-time mapper 115 operate in a different manner.

The space-time mapper 115 outputs the modulation symbols received from the modulator 113 to the first to fourth RF processors 117-1 to 117-4 in the manner illustrated in Table 2 below.

TABLE 2

|  | $t_1$ | $t_2$ |
|---|---|---|
| First Tx antenna 119-1-1 | ○ | ○ |
| Second Tx antenna 119-2 | ○ | ○ |
| Third Tx antenna 119-3 | ○ | ○ |
| Fourth Tx antenna 119-4 | ○ | ○ |

Let the modulation symbols from the modulator 113 be denoted by $x_1\ x_2\ x_3\ x_4$. It is assumed herein that the four-modulation symbols $x_1\ x_2\ x_3\ x_4$ form one codeword and four symbol time intervals are taken to transmit one codeword. Double-Space Time Transmit Diversity (D-STTD) scheme is used in the second embodiment of the present invention. Thus, for the input of the modulation symbols $x_1\ x_2\ x_3\ x_4$, the space-time mapper 115 outputs the following symbols by space-time mapping.

$$G_4 = \begin{bmatrix} x_1 & x_2 & x_3 & x_4 \\ -x_2^* & x_1^* & -x_4^* & x_3^* \end{bmatrix} \quad (2)$$

where $G_4$ represents a coding matrix for symbols transmitted through the four Tx antennas. The columns and rows of the coding matrix represent the Tx antennas and symbol time intervals, respectively.

Thus, for a first symbol time interval $t_1$, $x_1$ is transmitted through the first Tx antenna 119-1, $x_2$ through the second Tx antenna 119-2, $x_3$ through the third Tx antenna 119-3, and $x_4$ through the fourth Tx antenna 119-4. For a second symbol time interval $t_2$, $-x_1$ is transmitted through the first Tx antenna 119-1, $x^*_1$ through the second Tx antenna 119-2, $-x^*_4$ through the third Tx antenna 119-3, and $x^*_3$ through the fourth Tx antenna 119-4. In this way, for both symbol time intervals $t_1$ and $t_2$, symbols are transmitted through all the four Tx antennas 119-1 to 119-4.

In addition to the information data, a reference signal for channel estimation is transmitted through the first to fourth Tx antennas 119-1 to 119-4 for the codeword transmission time interval. The reference signal is a pilot signal, for example. Each of the Tx antennas 119-1 to 119-4 has to discontinue pilot transmission in subcarrier areas for the other Tx antennas.

While symbols are transmitted through all the Tx antennas for the symbol time intervals of the codeword transmission time interval, pilot signals are transmitted through only two Tx antennas for the symbol time intervals, which will be described with reference to FIG. 4.

Figure 4:
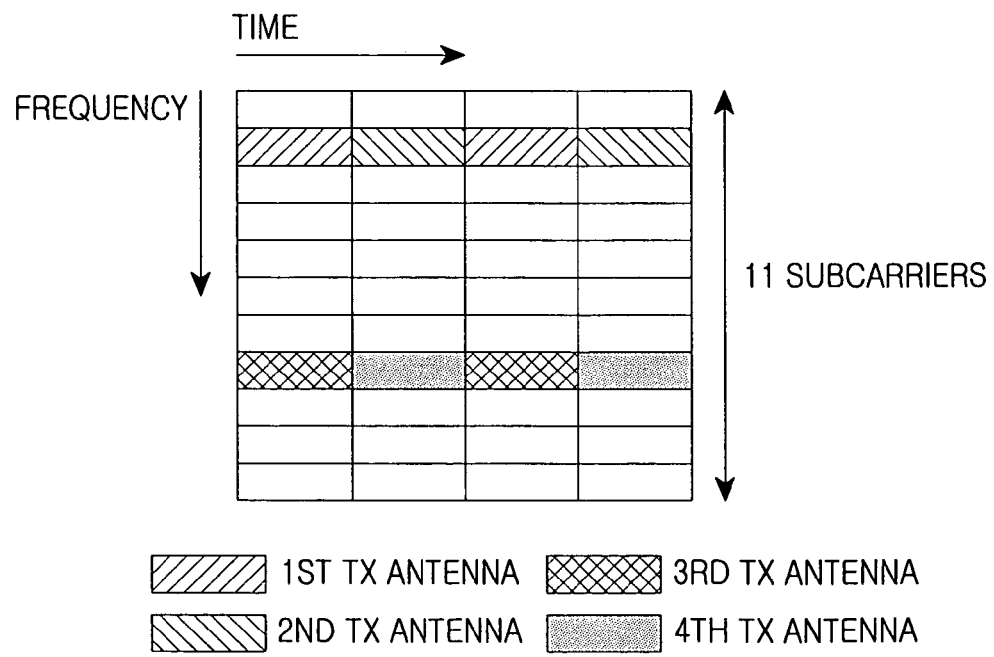
FIG. 4 illustrates a pilot signal transmission operation in the OFDM/OFDMA communication system with a plurality of Tx antennas using a STC scheme according to the present invention.

Referring to FIG. 4, pilot signals are transmitted through the first and second Tx antennas 119-1 and 119-2 for the first and third symbol time intervals $t_1$ and $t_3$, and through the third and fourth Tx antennas 119-3 and 119-4 for the second and fourth symbol time intervals $t_2$ and $t_4$.

Since pilot signals are transmitted through predetermined Tx antennas rather than through all the Tx antennas, limited resources, i.e. pilot subcarriers are shared between only two Tx antennas, not among all the Tx antennas, channel estimation performance is improved. Thus, a pilot signal is transmitted through each Tx antenna in every other symbol interval.

As symbols are transmitted through all the four Tx antennas and pilot signals through two Tx antennas in each symbol time interval, channel estimation is improved, as described above. In the case where channel status changes fast in the OFDM/OFDMA communication system, channel estimation can be carried out on a two symbol basis. The resulting increase of channel estimation reliability leads to the improved channel estimation performance.

While not described, a receiver receives signals from the transmitter through two or more Rx antennas. As shown in Table 2, the receiver receives signals from the four Tx antennas for four symbol time intervals in a rate 2 STC scheme, thereby achieving full diversity gain. Also, the receiver performs channel estimation on a two symbol basis. Since the transmitter transmits pilot signals through two Tx antennas in each symbol time interval, the channel estimation performance of the receiver is improved.

Figure 5:
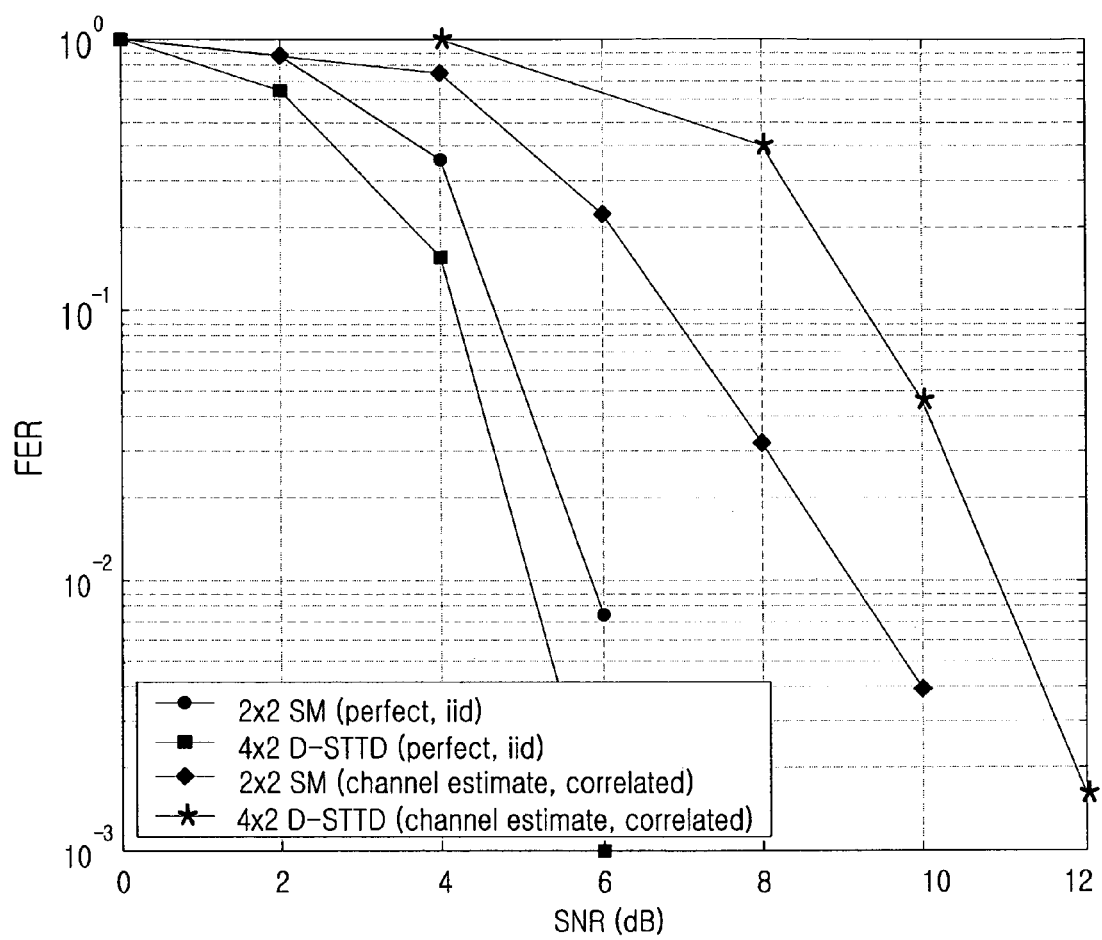
FIG. 5 is a graph comparing the signal transmission method according to the present invention with a typical signal transmission method in terms of antenna diversity gain in a diversity channel environment of the OFDM/OFDMA communication system.

With reference to FIG. 5, the signal transmission and reception according to the first embodiment of the present invention will be compared with typical signal transmission and reception in terms of antenna diversity gain in the diversity channel environment of the OFDM/OFDMA communication system.

Diversity gains shown in FIG. 5 are achieved under the assumption of a diversity channel environment and a velocity of 60 [Km/h]. Referring to FIG. 5, typically signal transmission and reception scheme in a 4×2 D-SSTD scheme offers higher diversity gain than that in a 2×2 Space Multiplexing (SM) scheme. However, when a signal is transmitted/received according to the first embodiment of the present invention, the 2×2 SM scheme provides a higher diversity gain than the 4×2 D-SSTD scheme.

As described above, the present invention offers the following benefits.

(1) In the signal transmission/reception scheme according to the first embodiment, symbols and pilots are transmitted through only two Tx antennas in each symbol time interval rather than through all of four Tx antennas. Therefore, channel estimation performance is improved. With the use of the two Tx antennas in each symbol time interval, only two RF processors are required, which leads to the decrease of hardware complexity and cost.

(2) In the signal transmission/reception scheme according to the second embodiment, symbols are transmitted through all of four Tx antennas and pilots through only two Tx antennas in each symbol interval time, thereby improving channel estimation performance. Hence, in the case where channel status changes fast in an OFDM/OFDMA communication system, channel estimation can be carried out on a two symbol basis. The resulting increase of channel estimation reliability leads to improved channel estimation performance.

While the invention has been shown and described with reference to certain preferred embodiments thereof, it will be understood by those skilled in the art that various changes in form and details may be made therein without departing from the spirit and scope of the invention as further defined by the appended claims.

What is claimed is:

1. A method of transmitting a signal in a signal transmitter with a plurality of antennas in a communication system, comprising:

generating symbols by mapping modulation symbols of channel coded transmission information data using a space time mapping scheme;

processing the generated symbols to Radio Frequency (RF) symbols; and transmitting the RF symbols through transmit antennas among the plurality of transmit antennas, wherein generating the symbols comprises generating the symbols by mapping the modulation symbols such that the generated symbols are transmitted through a limited number of transmit antennas during each symbol interval time and use all transmit antennas during a codeword transmission time interval defined as time required to transmit all the modulation symbols in a channel coded packet.

2. The method of claim 1, further comprising transmitting a reference signal through only the transmit antennas transmitting the symbols in each of the symbol time intervals.

3. The method of claim 2, wherein the reference signal is a pilot signal.

4. The method of claim 1, wherein the generating the symbols comprises generating the symbols by mapping the modulation symbols such that the generated symbols are transmitted through first and third antennas in first and second symbol time intervals t1 and t2, and the generated symbols are transmitted through second and fourth antennas in third and fourth symbol time intervals t3 and t4 if the number of the antennas is 4 and a codeword transmission time interval includes four symbol time intervals t1, t2, t3 and t4.

5. The method of claim 4, further comprising transmitting a reference signal through the antennas in each of the four symbol time intervals.

6. The method of claim 5, wherein the reference signal is a pilot signal.

7. A method of transmitting a signal in a signal transmitter with a plurality of antennas in a communication system, comprising:

generating symbols by mapping modulation symbols of channel coded transmission information data using a space time mapping scheme;

processing the generated symbols to Radio Frequency (RF) symbols; and transmitting the RF symbols through transmit antennas among the plurality of transmit antennas, wherein generating the symbols comprises generating the symbols by mapping the modulation symbols such that the generated symbols corresponding to a coded word are transmitted through a limited number of transmit antennas in each symbol interval time and use all transmit antennas among the symbol interval times of a codeword transmission time interval defined as time required to transmit all the modulation symbols in a channel coded packet.

8. The method of claim 7, further comprising transmitting a reference signal through the limited number of antennas utilized in each of the symbol time intervals.

9. The method of claim 8, wherein the reference signal is a pilot signal.

10. The method of claim 7, wherein generating the symbols comprises generating the symbols by mapping the modulation symbols such that the generated symbols are transmitted through first to fourth antennas in first and second symbol time intervals t1 and t2 if the number of the antennas is 4 and the codeword transmission time interval includes four symbol time intervals t1, t2, t3 and t4.

11. The method of claim 10, further comprising transmitting a reference signal through the first and second antennas in the first symbol time interval t1, and transmitting the reference signal through the third and fourth antennas in the second symbol time interval t2.

12. The method of claim 11, wherein the reference signal is a pilot signal.

13. The method of claim 7, wherein the mapping step comprises mapping the modulation symbols such that the generated symbols are transmitted through first to fourth antennas in third and fourth symbol time intervals t3 and t4 if the number of the antennas is 4 and the codeword transmission time interval includes four symbol time intervals t1, t2, t3 and t4.

14. The method of claim 13, further comprising transmitting a reference signal through the first and second antennas in the third symbol time interval t3, and transmitting the reference signal through the third and fourth antennas in the fourth symbol time interval t4.

15. The method of claim 14, wherein the reference signal is a pilot signal.

16. A signal transmitter with a plurality of antennas in a communication system, comprising:

a space-time mapper for generating symbols by mapping modulation symbols of channel coded transmission information data using a space-time mapping scheme and providing the generated symbols to Radio Frequency (RF) processors;

a plurality of RF processors for processing the generated symbols to RF symbols; and a plurality of switches coupled to the plurality of RF processors, for switching the plurality of RF processors to the plurality of antennas so that signals output from the RF processors are transmitted through the antennas, wherein the space-time mapper generates the symbols by mapping the modulation symbols such that the generated symbols are transmitted through a limited number of antennas in each symbol interval time and utilize all transmit antennas during a codeword transmission time interval defined as time required to transmit all the modulation symbols.

17. The signal transmitter of claim 16, wherein the space-time mapper generates the symbols by mapping a reference signal such that the reference signal is transmitted through only the antennas transmitting the symbols in each of the symbol time intervals.

18. The signal transmitter of claim 17, wherein the reference signal is a pilot signal.

19. The signal transmitter of claim 16, wherein if the number of the antennas is 4 and the codeword transmission time interval includes four symbol time intervals t1, t2, t3 and t4, the space-time mapper generates the symbols by mapping the modulation symbols such that the generated symbols are transmitted through first and third antennas in first and second symbol time intervals t1 and t2, and the generated symbols are transmitted through second and fourth antennas in third and fourth symbol time intervals t3 and t4.

20. The signal transmitter of claim 19, wherein the space-time mapper maps a reference signal such that the reference signal is transmitted through the antennas transmitting the generated symbols in each of the four symbols time intervals.

21. The signal transmitter of claim 20, wherein the reference signal is a pilot signal.

22. A signal transmitter with a plurality of antennas in a communication system, comprising:

a space-time mapper for generating symbols by mapping modulation symbols of channel coded transmission information data using a space-time mapping scheme and providing the generated symbols to Radio Frequency (RF) processors; and a plurality of RF processors for processing the generated symbols to RF symbols and providing the RF symbols to antennas, wherein the space-time mapper generates the symbols by mapping the channel coded modulation symbols such that the generated symbols are transmitted through a limited number of transmit antennas in each symbol interval and use all transmit antennas among the symbol interval times of a codeword transmission time interval defined as time required to transmit all the modulation symbols.

23. The signal transmitter of claim 22, wherein the space-time mapper maps a reference signal such that the reference signal is transmitted through antennas in each of the symbol time intervals.

24. The signal transmitter of claim 23, wherein the reference signal is a pilot signal.

25. The signal transmitter of claim 22, wherein if the number of the antennas is 4 and the codeword transmission time interval includes four symbol time intervals t1, t2, t3 and t4, the space-time mapper generates the symbols by mapping the modulation symbols such that the generated symbols are transmitted through first to fourth antennas in first and second symbol time intervals t1 and t2.

26. The signal transmitter of claim 25, wherein the space-time mapper maps a reference signal such that the reference signal is transmitted through the first and second antennas in the first symbol time interval t1, and transmitting the reference signal through the third and fourth antennas in the second symbol time interval t2.

27. The signal transmitter of claim 26, wherein the reference signal is a pilot signal.

28. The signal transmitter of claim 22, wherein if the number of the antennas is 4 and the codeword transmission time interval includes four symbol time intervals t1, t2, t3 and t4, the space-time mapper maps the modulation symbols such that the generated symbols are transmitted through first to fourth antennas in third and fourth symbol time intervals t3 and t4.

29. The signal transmitter of claim 28, wherein the space-time mapper maps a reference signal such that the reference signal is transmitted through the first and second antennas in the third symbol time interval t3, and transmitting the reference signal through the third and fourth antennas in the fourth symbol time interval t4.

30. The signal transmitter of claim 29, wherein the reference signal is a pilot signal.

* * * * *